April 9, 1929.   P. ARZIG   1,708,823
BUTTERFLY TOY
Filed Feb. 1, 1928
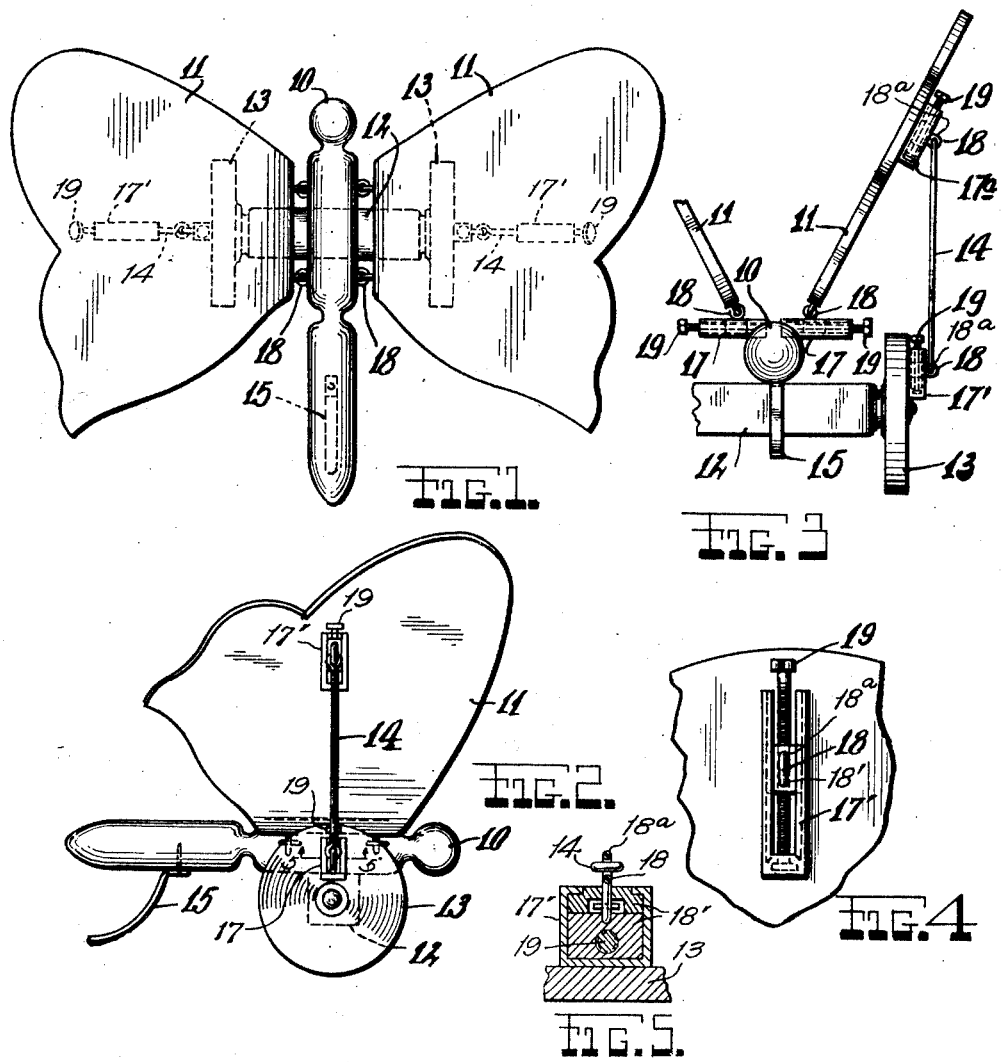
INVENTOR
BY Paul Arzig
ATTORNEY Patented Apr. 9, 1929.

1,708,823

UNITED STATES PATENT OFFICE.

PAUL ARZIG, OF NEW YORK, N. Y.

BUTTERFLY TOY.

Application filed February 1, 1928. Serial No. 250,978.

This invention relates generally to toys, and has more particular reference to a novel butterfly toy.

The invention has for an object the provision of a device of the class mentioned which is of simple durable construction, desirable and attractive in action, and which can be manufactured and sold at a reasonable cost.

The device has a body simulating the body of a butterfly and a pair of wings pivotally connected to the body. A transverse axle is secured to the body, and wheels are secured to the ends thereof. Connecting links are secure at one end eccentrically to the wheels, and at the other end to the wings, so that the wings flap up and down as the wheels turn, when for example the device is pulled forward. Various adjusting means may be arranged on the device to change the amplitude of wing motion.

For further comprehension of the invention, and of the objects and advantages thereof, reference will be had to the following description and accompanying drawings, and to the appended claims in which the various novel features of the invention are more particularly set forth.

Referring to the accompanying drawing, forming a material part of this disclosure:—

Fig. 1 is a plan view of a device constructed according to this invention, the wings thereof are in completely spread position.

Fig. 2 is a side view thereof, the wings are in completely raised position.

Fig. 3 is a fragmentary rear end view thereof.

Fig. 4 is a front view of a wing adjusting device used in this invention.

Fig. 5 is a fragmentary sectional view taken on the line 5—5 of Fig. 2.

The reference numeral 10 indicates a body simulating a butterfly's body. Wings 11 are pivotally secured to the sides of the body. A transverse shaft 12 is secured beneath the body. Wheels 13 are mounted on the ends of the shaft 12. Links 14 are connected at one of their ends eccentrically to the wheels 13, and at their other ends to the wings 11, these connections are loose so as to allow the links considerable play. A foot 15 may be attached to the body 10.

In operation the device is drawn forward on the wheels, so that the wheels turn. The links 14 and wings 11 are caused to move up and down, making it appear that the butterfly is flapping its wings.

A pair of guide members 17 are attached to the body 10, guide members 17' are attached to the wheels 13 and guide members 17$^a$ are attached to the wings 11. In each of the guide members there is a slide 18, a threaded rod 19 engaging the slide and rotatively mounted in the guide member. The slides 18 consist of members 18' arranged for sliding and eye members 18$^a$ rotatively connected on the members 18'. The lower end of wings 11 are hingedly connected to the slide 18 of the guide members attached to the body 10, the upper ends of the links 14 are hingedly connected to the slide 18 of the guide members secured to the wings, and the lower ends of the links 14 are hingedly connected to the slide 18 of the guide members secured to the wheels 13. The rods 19 may be manually turned to move the slide members 18 to vary the amplitude of the wing motion of the device.

While I have shown and described a preferred embodiment of my invention, it is to be understood that I do not limit myself to the precise construction herein disclosed and the right is reserved to all changes and modifications coming within the scope of the invention as defined in the appended claims.

Having thus described my invention, what I claim as new and desire to secure by United States Letters Patent is:—

1. In a device of the class described, a body member having a transverse shaft attached thereto and provided with wheels, wings, guide members attached to the said body member and arranged for pivotally and adjustably supporting the said wings, and links eccentrically connecting the wings to the said wheels.

2. A device of the class described, comprising a body member having a transverse shaft attached thereto and provided with wheels, wings, guide members attached to the said body member and arranged for pivotally and adjustably supporting the said wings, links, and guide members attached to the said wings and arranged for pivotally and adjustably connecting with one of the ends of the said links, and other guide members eccentrically attached to the said wheels and arranged for adjustably connecting with the other ends of the said links.

3. In a device of the class described, a body member having a transverse shaft attached thereto and provided with wheels, wings, guide members attached to the said body member, slides mounted in the said guides, screws threadedly engaging the slides and rotatively mounted in the said guides, the said wings being pivotally connected on the said slides, and links eccentrically connecting the wings to the said wheels.

In testimony whereof I have affixed my signature.

PAUL ARZIG.